July 8, 1958 P. H. TAYLOR 2,842,356
LIQUID SPRING

Filed April 14, 1955 2 Sheets-Sheet 1

INVENTOR.
Paul H. Taylor
BY
Attorney

INVENTOR.
Paul H. Taylor
BY
Attorney.

United States Patent Office 2,842,356
Patented July 8, 1958

2,842,356
LIQUID SPRING

Paul H. Taylor, Grand Island, N. Y., assignor to Wales-Strippit Corporation, North Tonawanda, N. Y., a corporation of New York Application April 14, 1955, Serial No. 501,273

6 Claims. (Cl. 267—1)

The present invention relates generally to liquid springs, and, more particularly to a double-acting liquid spring.

One of the problems in utilization of liquid springs is that in many instances they are required to be double-acting; that is, they must act in both compression and tension. This can be achieved by providing two separate chambers; that is, in effect, providing almost two separate liquid springs, one to act in compression and the other to act in tension. Because of the high cost of liquid springs and because of the space factor, this is not ordinarily practical; and in many instances liquid springs have been abandoned because of the cost and space requirements of a double-acting unit.

To reduce costs, a mechanical adapter cage may be provided for a conventional compression-type liquid spring, the cage being mounted to surround the spring and to be operatively connected to it in such manner that compression and/or tension forces are transmitted to the spring after compression. Thus double-action can be achieved. However, the cage adds greatly to the spring's bulk. Not infrequently the bulk becomes so great that the advantage of a liquid spring is obviated; and a less expensive mechanical spring is more easily used. Furthermore, the cage arrangement causes difficulty in that the friction loss in the various sliding members results in a loss of spring force and detracts from the usefulness of the spring.

There are, however, a great many applications for a double acting liquid spring. For instance, in the elevating mechanism of a tank gun, such a unit has advantageous use. The heavy, main gun of a tank, for instance, is supported at other than the center of gravity of the tank. When the tank travels over rough terrain at high speed, with this gun bouncing, due to its mass the rack and other mechanism, which is utilized to position the gun for firing, is subject to great stress. Investigation has shown that this gun stress has a magnitude of as much as a million p. s. i. Such stress, in time, will render the gun inoperative because the parts of the elevating mechanism are for other practical reasons built only for stresses of a magnitude of one hundred thousand p. s. i.

A primary object of this invention is to provide a single liquid spring which in itself and without any outside adapter, such as a cage, will be double acting and can be used both in compression and in tension. To this end, it is a prime purpose of this invention to provide a double-acting spring from a single liquid spring.

Another object of this invention is to provide a liquid spring of the character described which is of extremely small size for the force to which it may be subjected.

Another object of this invention is to provide a liquid spring of the character described which is less than one-half the size of a double-chambered liquid spring.

Another object of this invention is to provide a double acting liquid spring which is of sufficiently small size to be incorporated into a structural member subject to high impact forces.

A further object of this invention is to provide a double-acting liquid spring which has identical spring characteristics whether it is in compression or tension.

Other objects of this invention will be apparent hereinafter from the specification and from the recital of the appended claims.

Figure 1:
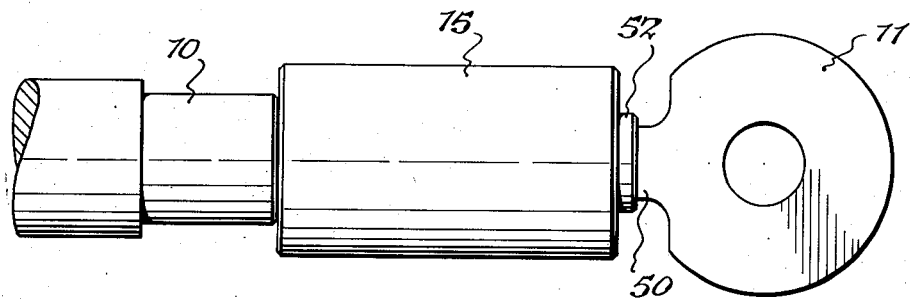
Fig. 1 is a fragmentary side view showing a double-acting liquid spring constructed according to one embodiment of this invention connecting the pin-eye and the rack of a gun-elevating mechanism.

In use, the spring of this invention is preferably incorporated directly in the mechanism with which it is to be utilized. Thus, it may be directly incorporated in the gun-elevating mechanism of a tank.

In the embodiment of the invention illustrated in the drawings 10 denotes the shaft member, and 11 the pin-eye of a gun-elevating mechanism. Interposed between these two and connected to both is a liquid spring 15 constructed according to the present invention.

The spring comprises a container 16 which has a bore 18 and a counterbore 20. Bore 18 is closed at one end by a plug 22 that is threaded and brazed in the bore. Plug 22 has a bore 24 in which a piston 26 is reciprocably mounted.

The piston 26 carries a male seal 28 and has an integral piston rod, or shaft 30. Piston rod 30 projects outwardly through an opening 32 in one end of the container 16, being reciprocal through a seal 34 of female type retained in the container 16. A retaining nut 36, which is recessed to receive the seal 34, and which threads into the opening 32, serves to hold the seal 34 in place.

The outwardly projecting end of piston rod 30 has a stop nut 38 threaded thereon. The shaft member 10 is deeply recessed, as denoted at 40, and the projecting end of the piston rod, with nut 38, is reciprocable in this recess. This recess is closed by a nut 44 which is threaded into the shaft member 10. Nut 44 has a hole 46 therethrough through which piston rod 30 reciprocates. Nut 38 engages nut 44 to limit movement of the piston 26 in one direction.

The pin eye 11 has a shank portion 50. The shank portion 50 has a plane inner face 56 to engage the plane outer face 58 of piston 26. A flanged collar 52 is threaded on the shank portion 50 to reciprocate in the counterbore 20 of container 16. Movement of the collar 52 outwardly of counterbore 20 is limited by a ring-nut or collar 54 which is threaded in the right hand end (Fig. 2) of the container 16.

The bore 18 of container 16 is filled with a compressible liquid L, such as a silicone base liquid. The liquid in the spring is preloaded, say to 5,000 p. s. i. so that motion in either direction of the parts 10 and 11 of the gun elevating mechanism, that is, motion in tension or compression, will cause compression of the liquid L. This is accomplished by adjusting nut 36 which controls the position of seal 34. Preloading may also be achieved by adjustment of nut 44. The difference in areas of the seal 28 and of shank 30 of the piston causes the liquid L in bore or chamber 18 to be compressed (preloaded) as the nut 44 is adjusted to move the piston to the left in Fig. 2. The spring is shown in neutral position in Fig. 2, but preloaded.

Figure 4:
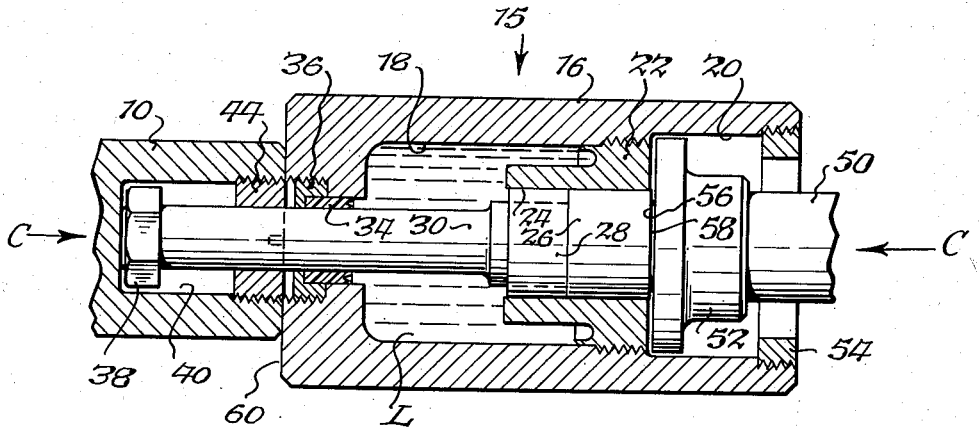
Fig. 4 is an axial section of the parts showing the spring under a compression load.
Figure 5:
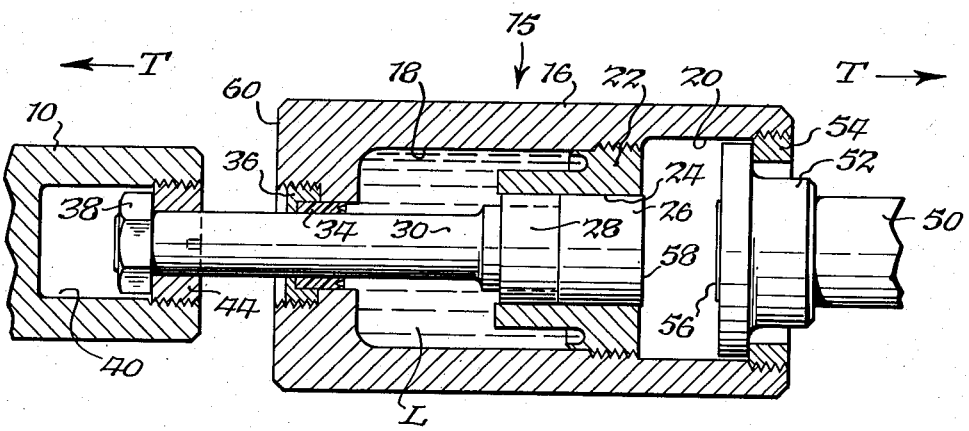
Fig. 5 is a similar section showing the spring under a tension load.

The operation of the spring is illustrated in Figs. 4 and 5.

Assuming that the spring is employed in the gun-elevating mechanism of a tank, as the tank travels at high speed over rough terrain, the tank gun will tend to bounce up and down. On downward movement of the gun relative to the tank, with a force in excess of the spring preload (5,000 lbs.), the liquid in the spring will be compressed; and on upward movement of the gun relative to the tank, with a force in excess of the spring preload, the spring will be put in tension.

Figure 3:
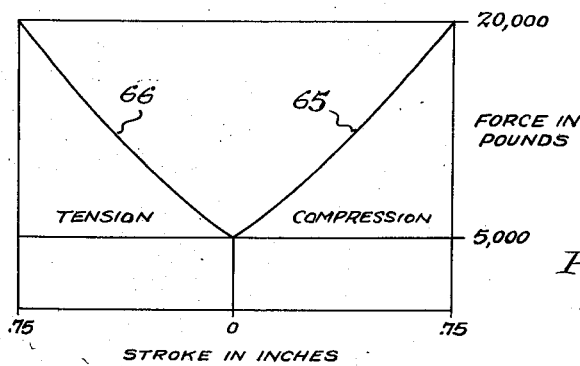
Fig. 3 is a graph illustrating the operating characteristics of the spring.

Fig. 4 illustrates the application of a compressive force to the spring, the force C being applied through rack member 10 and pin eye 11. Member 10 bears directly on the base 60 of the spring body 16, while pin eye 11 through its shank 50 applies a compression load to piston 26, causing the piston to compress the liquid L in the chamber 18. The action is illustrated diagrammatically in Fig. 3, curve 65 designating the resulting compression curve as the liquid is compressed in chamber 18 from 5000 p. s. i. to 20,000 p. s. i., the stroke here being assumed to be .75 inch.

When the downward, compressing force of the gun is relieved, the liquid L expands back to its original preloaded volume, thereby returning the piston 26, the pin eye 11, and the gun itself back to their starting positions.

Fig. 5 illustrates the action of the spring under a tension load T. As the tank gun moves upwardly collar 52 bears on ring 54 applying a tensioning load to spring body, or container 16. At the same time nut 44 through collar or nut 38 is applying a tension load to piston 26, causing the piston again to compress the liquid L in the chamber 18. The tension curve is denoted at 66 in Fig. 3.

Figure 2:
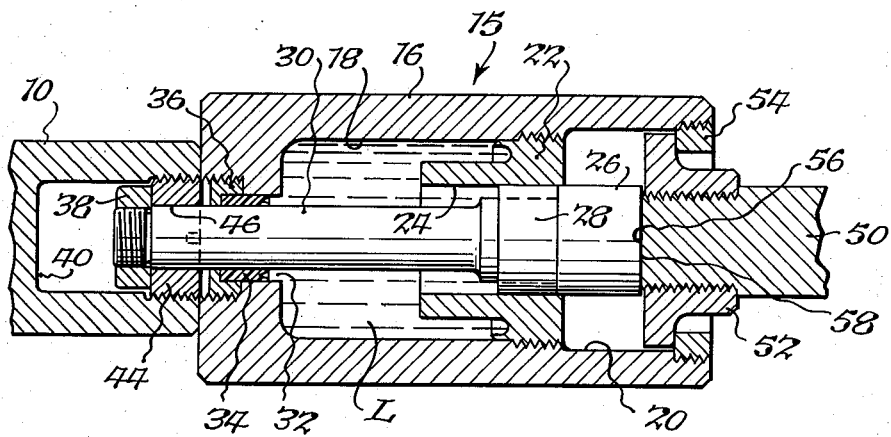
Fig. 2 is an axial section of these parts on a somewhat enlarged scale, showing the spring in neutral position.

When the tensioning force is relieved, the expanding liquid L returns the parts again to the positions shown in Fig. 2.

It will thus be seen that the single spring unit 15 acts both in tension and compression, while being only a single compression spring. It will further be apparent that this spring exhibits identical operating characteristics on either side of its zero point. Further, the unit forms a small, compact unit free from the disadvantages both of a compression type spring having a tensioning adapter cage, and of a spring employing two separate chambers for tension and compression.

In use, springs made according to the present invention have been found capable of readily absorbing the inertia of the gun barrels of tanks and of reducing the forces, to which the parts of the gun elevating mechanism are subjected, below the 100,000 lbs. maximum allowable stress of these parts. This is accomplished, as described, by transferring the impact forces to the compressible liquid of the spring. With a spring made according to the present invention, a practically instantaneous million pound force can be distributed over as little as a three-quarter inch stroke of a piston, and this force can thereby be reduced well below the maximum allowable stress of the mechanism in which it is incorporated. When the spring is preloaded above the normal operating forces of the mechanism in which it is incorporated, the spring will behave as a solid link when it is subjected to normal operating forces. Let us assume, however, that the parts connected by the spring may be subjected to a force as great as a million pounds acting over a stroke of .01 inch, then on shock loads a 20,000 lb. capacity spring acting over a .75 inch stroke will readily absorb the million pound .01 stroke force of 10,000 inch lbs.

While the invention has been described in connection with a specific embodiment thereof and a specific use therefor, it will be understood that it is capable of further modification and use, and, this application is intended to cover any variations, uses or adaptations of the invention, following, in general, the principles of the invention and including such departures from the present disclosure as come within known or customary practice in the art to which the invention pertains and as may fall within the scope of the invention or the limits of the appended claims.

Having thus described my invention, what I claim is:

1. A double-acting liquid spring for absorbing both compression and tension forces between two spaced, relatively movable elements, said spring comprising a container having a chamber therein filled with a compressible liquid, a piston reciprocable in said chamber and adapted on movement in one direction in said chamber to compress said liquid, a piston rod secured to said piston and projecting from said container through one end thereof, lost-motion connecting means connecting the projecting end of said piston rod to one of said elements, lost-motion connecting means connecting said container at its opposite end to the other element, said one element being adapted to move relative to said piston rod into abutting relation with said container when said two elements move toward one another, and said other element being adapted to move into abutting engagement with said piston upon said movement of said two elements toward one another to force said piston into said container to compress said liquid in said chamber.

2. A double-acting liquid spring for absorbing both compression and tension forces between two spaced, relatively movable elements, said spring comprising a container having a chamber therein filled with a compressible liquid, a piston reciprocable in said chamber and adapted on movement in one direction in said chamber to compress said liquid, a piston rod secured to said piston and projecting from said container through one end thereof, lost-motion connecting means connecting the projecting end of said piston rod to one of said elements, lost-motion connecting means connecting said container at its opposite end to the other element, said one element being adapted to move relative to said piston rod into abutting relation with said container when said two elements move toward one another, and said other element being adapted to move into abutting engagement with said piston upon said movement of said two elements toward one another to force said piston into said container to compress said liquid in said chamber, and said one element being adapted to move into abutting engagement with said piston rod and said other element being adapted to move into abutting engagement with said container, when said two elements move away from one another, whereby also to force said piston into said container to compress said liquid in said chamber.

3. The combination with two spaced relatively movable elements, of a double-acting liquid spring interposed between said elements for absorbing both compression and tension forces between said elements, said spring comprising a container having a chamber therein filled with a compressible liquid, a piston reciprocable in said chamber, a piston rod secured to said piston and projecting through one end of said container, and lost motion connections between both of said elements and said spring, one of said elements being recessed to receive said piston rod and having a portion adapted to abut against said container on movement of said one element in one direction relative to said container, and said one element and said piston rod having cooperating portions adapted to limit relative movement between said one element and said piston rod on movement of said one element relative to said piston rod in the opposite direction, the recess in said one element and said cooperating portions providing the lost motion connection of said one element with said spring.

4. The combination with two spaced, relatively movable elements, of a double-acting liquid spring interposed between said elements for absorbing both compression and tension forces between said elements, said spring comprising a container having a chamber therein filled with a compressible liquid, a piston reciprocable in said chamber, a piston rod secured to said piston and projecting through one end of said container, a lost motion connection between one of the said elements and said piston rod and said container, and a lost motion connection between the other element and said piston and said container, said container having a recess at its opposite end, and said other element being provided with a portion reciprocable in said recess and adapted to abut against said piston on movement of said portion inwardly of said container, and means for connecting said container to said other element on movement of said other element in the opposite direction, said recess, said portion, and the last-named means providing the lost motion connection of said other element to said spring.

5. The combination with two spaced, relatively movable elements, of a double-acting liquid spring interposed between said elements for absorbing both compression and tension forces, said spring comprising a container having a chamber therein filled with a compressible liquid, a plug closing said chamber at one end, said plug having a hole therethrough, a piston reciprocable in said chamber and through said hole and having liquid-tight connection with the wall of said hole, said piston having a piston rod secured thereto which projects outwardly through a hole in the opposite end of said chamber, means for sealing against leakage of liquid from said chamber through the last-named hole, one of said elements being recessed to receive the projecting end of said piston rod, means secured to said piston rod for limiting relative movement between said one element and said piston rod in one direction, said one element having a portion adapted to abut against one end of said container on movement of said one element relative to said piston rod in the opposite direction, said container having a recess therein at its end opposite from that which is abuttable by said one element, the other element having a portion reciprocable in the last-named recess and adapted to abut against said piston on movement of said other element toward said one element, and means for connecting said container to said other element together on movement of said other element in the opposed direction.

6. The combination with two spaced, relatively movable elements, of a double acting liquid spring interposed between said elements for absorbing both compression and tension forces, said spring comprising a container having a chamber therein filled with a compressible liquid, a plug closing said chamber at one end, said plug having a hole therethrough, a piston reciprocable in said chamber and through said hole and having liquid-tight connection with the wall of said hole, said piston having a piston rod secured thereto which projects outwardly through a hole in the opposite end of said chamber, means for sealing against leakage of liquid from said chamber through the last-named hole, one of said elements being recessed to receive the projecting end of said piston rod, a nut on said piston rod, a collar secured to said one element and closing the open end of said recess, said collar being bored for passage therethrough of said piston rod, said container having a recess therein external of said chamber and adjacent said plug, the other element having a second collar secured thereto which is reciprocable in the last-named recess, and a ring secured in said container at the open end of said last-named recess in position to engage said second collar to connect said other element and said container together on movement of said other element away from said one element.

References Cited in the file of this patent

UNITED STATES PATENTS

| | | |
|---|---|---|
| 2,346,667 | Dowty | Apr. 18, 1944 |
| 2,691,518 | Smith | Oct. 12, 1954 |
| 2,723,847 | Hogan | Nov. 15, 1955 |

FOREIGN PATENTS

| | | |
|---|---|---|
| 849,044 | Germany | Sept. 11, 1952 |
| 1,071,752 | France | Mar. 10, 1954 |

(Corresponding U. S. Patent 2,732,898, Jan. 31, 1956)